US012246701B2

(12) United States Patent
Dieckmann et al.

(10) Patent No.: US 12,246,701 B2
(45) Date of Patent: Mar. 11, 2025

(54) VEHICLE SYSTEM HAVING AN ESC-FAULT-TOLERANT BRAKING SYSTEM

(71) Applicant: ZF CV Systems Global GmbH, Bern (CH)

(72) Inventors: Thomas Dieckmann, Pattensen (DE); Ralph-Carsten Lülfing, Garbsen (DE); Arne Michaelsen, Seelze (DE); Tobias Munko, Hannover (DE); Robert Otremba, Ronnenberg (DE); Julian van Thiel, Grossburgwedel (DE)

(73) Assignee: ZF CV Systems Global GmbH, Bern (CH)

( * ) Notice: Subject to any disclaimer, the term of this patent is extended or adjusted under 35 U.S.C. 154(b) by 234 days.

(21) Appl. No.: 18/058,620

(22) Filed: Nov. 23, 2022

(65) Prior Publication Data

US 2023/0087332 A1    Mar. 23, 2023

Related U.S. Application Data

(63) Continuation of application No. PCT/EP2021/067791, filed on Jun. 29, 2021.

(30) Foreign Application Priority Data

Jul. 1, 2020    (DE) .................... 10 2020 117 322.9

(51) Int. Cl.
  *B60W 30/02*    (2012.01)
  *B60W 10/184*   (2012.01)
  (Continued)

(52) U.S. Cl.
  CPC .......... *B60W 30/02* (2013.01); *B60W 10/184* (2013.01); *B60W 10/20* (2013.01);
  (Continued)

(58) Field of Classification Search
  CPC ........... B60T 2260/02; B60T 2270/402; B60T 2270/413; B60T 8/1708; B60T 8/885; B60T 8/1755
  See application file for complete search history.

(56) References Cited

U.S. PATENT DOCUMENTS

2019/0118786 A1    4/2019  Wulf
2019/0217842 A1*   7/2019  Leinung ................ B60T 13/683
  (Continued)

FOREIGN PATENT DOCUMENTS

DE    10 2016 005 317 A1    11/2017
DE       102017010716 A1 *   5/2019    ................ B60T 7/12
  (Continued)

OTHER PUBLICATIONS

Translation of the Written Opinion of the International Searching Authority dated Sep. 14, 2021 for international application PCT/EP2021/067791 on which this application is based.
  (Continued)

*Primary Examiner* — Calvin Cheung
(74) *Attorney, Agent, or Firm* — Walter Ottesen, P.A.

(57) ABSTRACT

The disclosure relates to a vehicle system for a vehicle, in particular a commercial vehicle, that includes an electronically controllable pneumatic braking system, and an electronically controllable steering device. The electronically controllable pneumatic braking system has a redundant control unit, which controls the brake circuits in the event of a failure of an electronic stability control of the braking system during travel. In the event of the failure of the electronic stability control during travel, the redundant control unit performs axle-wise control of the front axle with a front axle redundancy brake pressure and/or of the rear axle with a rear axle redundancy brake pressure and the electronically controllable steering device carries out laterally stabilizing steering interventions in order to keep the vehicle (Continued)

in a tolerance corridor of a predefined target trajectory of the vehicle. The disclosure also relates to a vehicle and a method.

19 Claims, 5 Drawing Sheets

(51) Int. Cl.
  *B60W 10/20* (2006.01)
  *B60W 50/02* (2012.01)
  *B60W 50/029* (2012.01)
(52) U.S. Cl.
  CPC . *B60W 50/0205* (2013.01); *B60W 2050/0292* (2013.01); *B60W 2540/18* (2013.01); *B60W 2710/182* (2013.01); *B60W 2710/202* (2013.01); *B60W 2710/207* (2013.01); *B60W 2720/24* (2013.01)

(56) References Cited

U.S. PATENT DOCUMENTS

2021/0171062 A1\* 6/2021 Hecker ............ B60W 60/0015
2022/0266807 A1\* 8/2022 Van Thiel ............. B60T 17/221

FOREIGN PATENT DOCUMENTS

| DE | 10 2018 219 052 A1 | 5/2020 | |
|---|---|---|---|
| DE | 102019131110 A1 * | 5/2021 | ............ B60T 13/385 |
| WO | 2019/092150 A1 | 5/2019 | |

OTHER PUBLICATIONS

International Search Report of the European Patent Office dated Sep. 14, 2021 for international application PCT/EP2021/067791 on which this application is based.

\* cited by examiner

VEHICLE SYSTEM HAVING AN ESC-FAULT-TOLERANT BRAKING SYSTEM

CROSS-REFERENCE TO RELATED APPLICATIONS

This application is a continuation application of international patent application PCT/EP2021/067791, filed Jun. 29, 2021, designating the United States and claiming priority from German application 10 2020 117 322.9, filed Jul. 1, 2020, and the entire content of both applications is incorporated herein by reference.

TECHNICAL FIELD

The disclosure relates to a vehicle system for a vehicle, in particular a commercial vehicle.

BACKGROUND

In particular, a vehicle system of this type includes an electronically controllable, pneumatic braking system and an electronically controllable steering device, wherein the electronically controllable, pneumatic braking system has at least one first brake circuit, at least one second brake circuit, a central control unit for controlling the first and the second brake circuits, and at least first and second front axle brake actuators for at least first and second front wheels at least at one front axle, and at least first and second rear axle brake actuators for at least first and second rear wheels at least at one rear axle. The central control unit also has or is connected to an electronic stability control, which is configured for wheel-individually actuating the first and the second front axle brake actuators and/or the first and the second rear axle brake actuators. Moreover, the electronically controllable pneumatic braking system has a redundant control unit, which controls the first brake circuit and/or the second brake circuit in the event of a failure of the electronic stability control during a trip of the vehicle. The disclosure further relates to a method for decelerating and steering a vehicle, in particular a commercial vehicle, preferably including a vehicle system of the type mentioned at the outset, and a vehicle, in particular a commercial vehicle, that includes a vehicle system of the type mentioned at the outset.

Pneumatic braking systems that include two or more brake circuits are generally used in commercial vehicles. For example, a first brake circuit is provided for the front axle and a second brake circuit is provided for the rear axle. Alternatively, it is also conceivable that a first brake circuit is provided for the left side of the vehicle and a second brake circuit is provided for the right side of the vehicle. A crossover circuit can also be preferred. In addition, electronically controllable pneumatic braking systems can also include a third brake circuit, which, for example, is provided for a parking brake device and/or supplies a trailer.

Within the scope of the ever increasing autonomization of vehicles, in particular vehicles at SAE level 3, 4, or 5, it is necessary that such braking systems can safely brake also in the event of a fault, that is, when one or multiple module(s), electrical control units, or other components fail. Known approaches for FOBS (fail-operational brake systems) primarily aim to ensure a remaining availability in the event of single point failures, in order to transfer the vehicle into a safe condition. The resultant remaining performance is frequently greatly degraded. Electronic stability controls are mostly no longer ensured.

Systems are known, for example, which, in the event of a fault of a central control unit, transfer the control to an electronic control unit of a further module, such as, for example, the electronic control unit of a front axle or rear axle modulator. There are also systems in which an electronic control unit of a parking brake module takes over the control of the braking system for the event of a fault in the central module. Moreover, systems exist that build up purely pneumatic redundancies by, for example, transferring pressures of one axle to another axle, in order to be able to at least pneumatically modulate a redundant pressure in this way.

Other approaches use systems that are configured completely in parallel. In such systems, two braking systems are configured in parallel and operate, for example, via shuttle valves on individual brake actuators. Although these systems are comprehensive and can form a majority of the functionalities of the primary braking system, these systems require a great deal of effort to assemble, have a great wiring complexity, and, thus, are cost-intensive.

SUMMARY

It is an object of the disclosure to provide a braking system having a high remaining availability, which can also carry out stability functions in the event of a fault.

This object can be achieved via a vehicle system wherein, in the event of the failure of the electronic stability control during a trip of the vehicle, the redundant control unit performs axle-wise control at least of the front axle with a front axle redundancy brake pressure and/or of the rear axle with a rear axle redundancy brake pressure, and the electronically controllable steering device carries out laterally stabilizing steering interventions to keep the vehicle in a tolerance corridor of a predefined target trajectory of the vehicle.

The disclosure is based on the idea of creating a fault-tolerant braking system by carrying out laterally stabilizing control interventions via a combination of axle-wise pressure controls at least at one axle and superposed steering interventions via an automated steering as fallback support when the electronic stability control of the primary system is no longer available. The first brake circuit is preferably provided for the front axle and is connected to the first and the second front axle brake actuators, in order to supply the front axle brake actuators with brake pressure. The second brake circuit is preferably provided for the rear axle and, accordingly, is connected to the first and the second rear axle brake actuators, in order to supply the rear axle brake actuators with brake pressure. It is to be understood, however, that other configurations are also possible. For example, the first brake circuit can also be provided for the first brake actuator at the left front wheel and the second brake actuator at the right rear wheel, while the second brake circuit is provided for the second front axle brake actuator at the right front wheel and the first rear axle brake actuator at the left rear wheel. The first brake circuit and the second brake circuit are both controlled by the central control unit, which can receive braking commands from a higher-order unit, such as, in particular, a unit for autonomous driving. The central control unit has an electronic stability control, which makes it possible to brake wheel-individually in certain braking situations. This means, different brake pressures are supplied to the first and the second front axle brake actuators and to the first and the second rear axle brake actuators, in order to be able to brake wheel-individually, in order to ensure the stability of the vehicle.

For the event in which this electronic stability control fails, for example, because the central control unit fails, because wheel speed sensors at one or multiple wheel(s) fail, or other faults are present that adversely affect the electronic stability control, the redundant control unit takes over the control of the braking system, in particular the control of the first and the second brake circuits. For the case in which the redundant control unit takes over the control, the redundant control unit performs axle-wise control of at least one of the axles, that is, the front axle and/or the rear axle. This means, the same brake pressure is provided at the appropriate brake actuators at the at least one axle that is controlled in an axle-wise manner. If, for example, only the front axle is controlled in an axle-wise manner, the redundant control unit prompts the same brake pressure to be modulated at the first front axle brake actuator and the second front axle brake actuator, regardless of whether wheel speeds differ. Similarly, the rear axle can be controlled in an axle-wise manner such that the same brake pressure is modulated at the first and the second rear axle brake actuators. In the event of the axle-wise control, the front axle redundancy brake pressure and/or the rear axle redundancy brake pressure are/is appropriately modulated. In addition, if the vehicle should include a second front axle, the second front axle can also be controlled in an axle-wise manner, similarly to a second rear axle, a supplementary axle, and the like. If the vehicle has, for example, five axles, preferably a total of ten brake actuators are provided, wherein each axle can be individually controlled in an axle-wise manner or the control of axles can be combined to form one or multiple axle group(s). Within the scope of the disclosure, it can also be provided, however, that only one axle is controlled in an axle-wise manner and a wheel-individual braking operation is still enabled for the other axles, for example, via redundant wheel speed sensors and an at least partially redundant electronic stability control. Within the scope of the disclosure, however, at least one axle is controlled in an axle-wise manner. In order to nevertheless ensure the stability of the vehicle, the electronically controllable steering device is prompted to carry out laterally stabilizing steering interventions, in order to keep the vehicle in a tolerance corridor of the predefined target trajectory of the vehicle. Via the electronically controllable steering device, therefore, the no longer wheel-individual braking operation at the axle controlled in an axle-wise manner is compensated for by appropriate steering interventions. In this manner, a stability functionality can still be easily implemented in the braking system, even though the electronic stability control of the primary system has failed.

The target trajectory and the tolerance corridor for the target trajectory are preferably provided by a unit for autonomous driving, for example, via a vehicle bus. These can be provided at the central control unit, the redundant control unit, and/or at the or by the electronically controllable steering device. Preferably, all three modules receive the target trajectory and the tolerance corridor. The electronically controllable steering device carries out the laterally stabilizing steering interventions when the electronic stability control of the primary system has failed. It can also be provided that the electronically controllable steering device is also additionally implemented while the electronic stability control of the primary system functions, in order to achieve further functionalities.

In one preferred specific embodiment, the electronically controllable steering device receives a steering wheel angle and/or a steering torque as a target value for the laterally stabilizing steering interventions and modulates these and/or this. Preferably, the electronically controllable steering device is connected for this purpose to the electronically controllable pneumatic braking system, preferably to the redundant control unit, to the electronic stability control, or to a redundant electronic stability control, and/or to a unit for autonomous driving, and is configured to receive the steering wheel angle and/or the steering torque as a target value. The electronically controllable steering device is then preferably also configured to process these and, in conformance with these, modulate laterally stabilizing steering interventions. This target value is preferably provided by the electronically controllable pneumatic braking system, preferably from the redundant control unit, from the electronic stability control, or from a redundant electronic stability control.

Preferably, the electronically controllable steering device is connected to the central control unit for receiving ESC signals from the electronic stability control or signals derived or processed from the ESC signals. A derived or processed signal of this type can be, in particular, an additional steering signal (for example, steering wheel angle and/or the steering torque). Preferably, the electronically controllable steering device is also connected to the redundant control unit, in order to receive therefrom, if necessary, redundant ESC signals or other signals, or to provide the received ESC signals or the signals derived or processed from the ESC signals to the redundant control unit.

It is further preferred when the vehicle system includes a redundant electronic stability control, which is connected to the redundant control unit and provides redundant ESC signals to the redundant control unit. Preferably, the redundant control unit has the redundant electronic stability control. The redundant ESC signals can be used on the one hand for controlling those axles in a wheel-wise manner that are not controlled in an axle-wise manner. On the other hand, the redundant ESC signals can also be used to modulate the laterally stabilizing steering interventions via the electronically controllable steering device. The electronically controllable steering device can be configured, for this purpose, to take the redundant ESC signals into account in the modulation of the laterally stabilizing steering interventions.

Accordingly, the electronically controllable steering device is preferably connected to the redundant control unit or to the redundant electronic stability control for receiving redundant ESC signals.

It is further preferred when the central control unit is connected to a first voltage source and the redundant control unit is connected to a second voltage source, which is independent of the first voltage source. According to this aspect, the central control unit and the redundant control unit are supplied from two separate and independent voltage sources. If, for example, the electronic stability control of the central control unit should fail since the first voltage source of the central control unit has failed, it is ensured according to this aspect that the redundant control unit is still supplied with voltage. As a result, the reliability of the vehicle system is increased.

Preferably, the electronically controllable steering device or a portion thereof is connected to the second voltage source. Preferably, the electronically controllable steering device is also connected to the first voltage source. This means, the electronically controllable steering device is supplied from the first voltage source and from the second voltage source. The electronically controllable steering device is therefore capable of continuing to operate with the second voltage source even though the first voltage source has failed, in order to modulate the laterally stabilizing steering interventions.

According to another embodiment, the redundant control unit is connected to the first and/or to the second wheel speed sensors for receiving wheel speed signals. Preferably, first wheel speed sensors are arranged at the front axle and second wheel speed sensors are arranged at the rear axle. In particular, a wheel sensor is arranged at each front wheel of the front axle, namely first and second front axle wheel speed sensors. At the rear axle, a wheel speed sensor is preferably arranged at each rear wheel, namely first and second rear axle wheel speed sensors. These each provide a wheel speed signal, preferably at the redundant control unit. The first and the second wheel speed sensors provide the wheel speed signals preferably also at the central control unit and, if necessary, at further modules, such as, in particular, at the unit for autonomous driving. It is also conceivably preferable to provide these signals via a vehicle bus.

Preferably, the vehicle system also has a parking brake circuit that includes a parking brake module connected to the central control unit, and at least first and second spring-loaded actuators at least at the rear axle or a further rear axle, wherein the redundant control unit forms an electronic control unit of the parking brake module or is integrated therewith. The parking brake module is preferably connected to a third compressed air reservoir and is part of a third brake circuit. The spring-loaded actuators are preferably integrated with the first and the second rear axle brake actuators, in order to form tristop brake actuators. According to this aspect, the redundant control unit is preferably integrated with or identical to the electronic control unit of the parking brake module. The parking brake module is preferably configured to take over the control of the braking system in a redundancy case when the central control unit does not function or does not function correctly. Therefore, the parking brake module is preferably also connected to the unit for autonomous driving and to the central control unit and receives the same signals.

In another embodiment, it is provided that, in the event of the failure of the electronic stability control, the redundant control unit provides the front axle redundancy brake pressure at the first and the second front axle brake actuators during the axle-wise modulation of the front axle redundancy brake pressure, in order to brake the front axle in an axle-wise manner. The same preferably also applies for the rear axle. Accordingly, it is preferably provided that, in the event of the failure of the electronic stability control, the redundant control unit provides the rear axle redundancy brake pressure at the first and the second rear axle brake actuators during the axle-wise modulation of the rear axle redundancy brake pressure, in order to brake the rear axle in an axle-wise manner.

In a second aspect, the disclosure solves the problem mentioned at the outset via a method for decelerating and steering a vehicle of the type mentioned at the outset, including the steps: ascertaining a failure of an electronic stability control of an electronically controllable pneumatic braking system; in response to the ascertainment of the failure: redundantly modulating a redundancy front axle brake pressure at least at one front axle and/or a redundancy rear axle brake pressure at least at one rear axle via a redundant control unit of the electronically controllable pneumatic braking system, and carrying out laterally stabilizing steering interventions via an electronically controllable steering device to keep the vehicle in a tolerance corridor of a predefined target trajectory of the vehicle.

The redundancy rear axle brake pressure can be modulated by a parking brake module and by another module, such as, for example, a rear axle modulator. The redundancy rear axle brake pressure can be provided as spring-loaded brake cylinders and at service brake cylinders at the rear axle. All combinations are conceivable and preferred here.

The method can preferably also include the steps: ascertaining a front axle cornering force at the front axle; ascertaining a rear axle cornering force at the rear axle; wherein the redundant control unit increases a brake pressure modulation at that vehicle axle from the front axle and the rear axle, at which the higher of the front axle cornering force and the rear axle cornering force is ascertained. The cornering forces can be ascertained, for example, on the basis of the vehicle model. The cornering force is a dynamic variable that depends on a slip angle, a wheel load, a slip, a wheel camber, and friction coefficients. The cornering force is an output variable of the vehicle model, which describes the dynamic vehicle condition on the basis of various dynamic sensor data (for example, lateral and longitudinal acceleration, yaw rate, steering angle, wheel speed, vehicle speed, et cetera) and statistical variables such as vehicle mass, center of gravity, wheelbase, vehicle geometry, et cetera. Depending on which of the axles has the greater cornering force, the modulated brake pressure is increased or a brake pressure distribution at the axles is redistributed in favor of the axle having the greater cornering force. This means, when, for example, a greater cornering force is present at the front axle than at the rear axle, the front axle redundancy brake pressure is increased by the redundant control unit.

In another embodiment, the method includes the steps: ascertaining an oversteer of the vehicle; and, in response thereto: increasing the brake pressure modulation of the redundancy front axle brake pressure at the front axle and optionally at a trailer; and steering via the electronically controllable steering device in the direction toward the outside of the curve. As a result, the oversteer can be reduced and the vehicle can be stably kept on the trajectory, even though the front axle redundancy brake pressure is controlled at the front axle only in an axle-wise manner. The steering toward the outside of the curve via the electronically controllable steering device then forms a laterally stabilizing steering intervention within the meaning of the invention. Additionally or alternatively, the braking of the trailer can be used to achieve an anti-jackknife braking.

In addition, the method preferably includes the steps: ascertaining an understeer of the vehicle; and, in response thereto: increasing the brake pressure modulation of the redundancy rear axle brake pressure at the rear axle and optionally at a trailer. A laterally stabilizing steering intervention of the electronically controllable steering device is not necessary in order to come out of an understeer in this embodiment. Rather, it suffices to increase the brake pressure modulation of the redundancy rear axle brake pressure, in particular for the case when the rear axle is controlled in an axle-wise manner. As a result, the vehicle is decelerated and the understeer is reduced. An optional additional braking of a trailer, which may be connected to the vehicle, can be provided. As a result, in one variant, the speed of the vehicle including the trailer can be rapidly reduced. It is also conceivable, however, to intentionally allow this to be slightly postponed in combination with increased brake pressure modulation at the rear axle of the vehicle, in order to further reduce the understeer. Another possibility for reducing the understeer can be carried out with the steps: setting a steering angle of approximately 0°; increasing a brake pressure modulation at preferably all axles to a maximum value that preferably still permits stable travel, that is, preferably without any or with only minor slip; both for a short period of time; and, thereafter: setting a steering wheel angle for aligning the vehicle trajectory with a planned vehicle trajectory. In this variant, it is accepted that the vehicle is moving somewhat too far toward the outside of the curve, but the short-term and intense removal of speed preferably brings the vehicle back into a stable condition, so that the vehicle can be guided on the planned trajectory again via an appropriate steering intervention. These variants can also be combined. For example, a steering angle can also be reduced by simply increasing the brake pressure modulation at the rear axle, in order to bring the vehicle into a stable condition.

In a third aspect, the problem mentioned at the outset is solved by a vehicle, in particular a commercial vehicle, with a vehicle system according to one of the above-described embodiments of a vehicle system according to the first aspect of the invention. Preferably, the vehicle system according to the first aspect of the disclosure, which is used in the vehicle according to the third aspect of the disclosure, is configured to implement the method according to the second aspect of the disclosure.

BRIEF DESCRIPTION OF DRAWINGS

The invention will now be described with reference to the drawings wherein.

DETAILED DESCRIPTION

Figure 1:
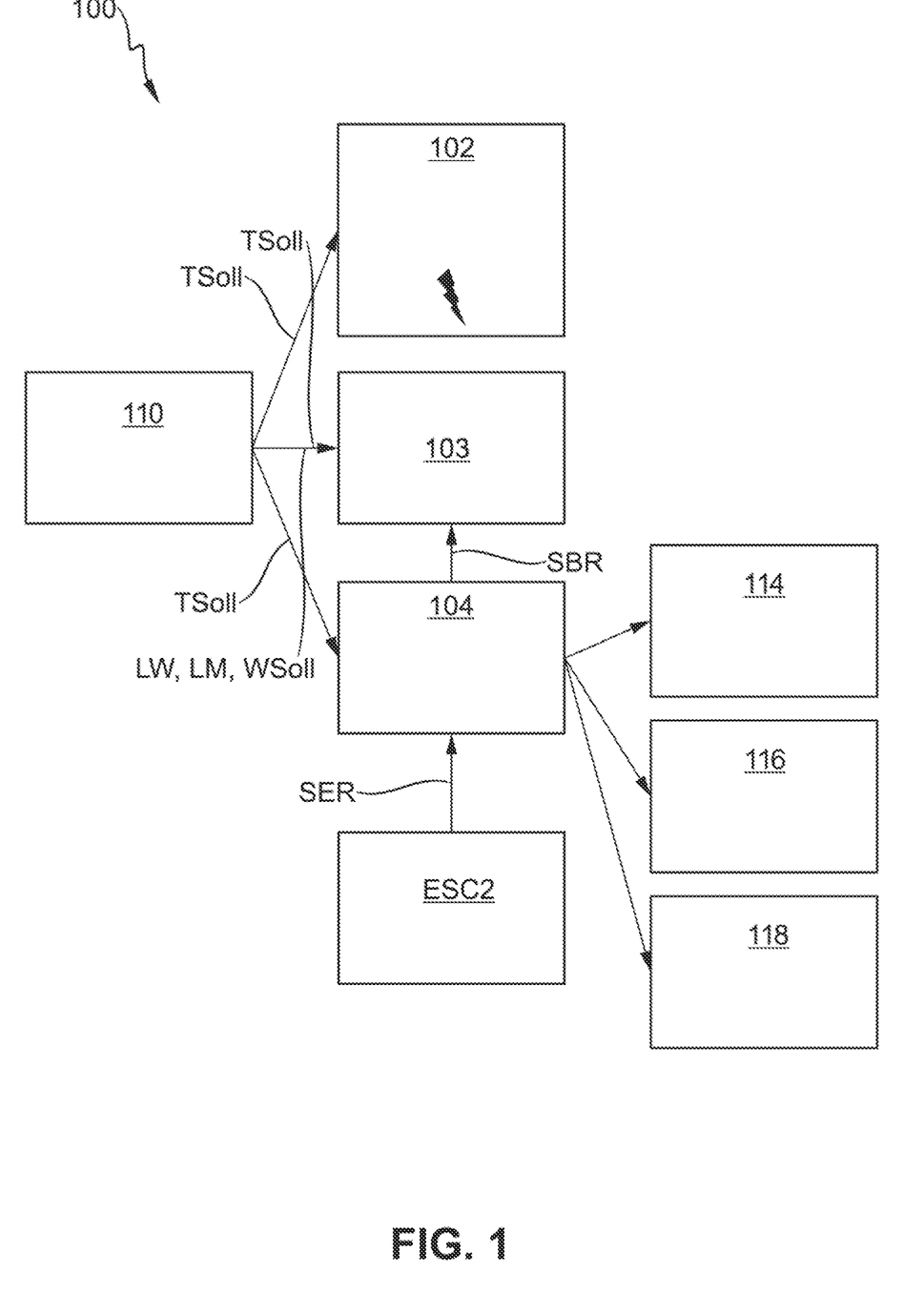
FIG. 1 shows a schematic system layout of the disclosure.

FIG. 1 illustrates, initially, the general configuration in the form of a block diagram of the vehicle system 100. The vehicle system 100 includes a central control unit 102, which is provided for controlling the electronically controllable pneumatic braking system 101 (cf. FIGS. 2 and 3). The central control unit 102 receives a target trajectory TSoll from a target trajectories controller 110. The target trajectories controller 110 can be, for example, part of a unit for autonomous driving 112 (cf. FIGS. 2 and 3), although it can also be provided separately within the vehicle 200. Moreover, it is possible that the target trajectories controller 110 is provided in a cloud service, or is supplied with data via a cloud service, the target trajectory TSoll being generated on the basis of the data. The vehicle system 100 also includes an electronically controllable steering device 103. The electronically controllable steering device 103 also receives the target trajectory TSoll from the target trajectories controller 110. The electronically controllable steering device 103 is provided for steering the vehicle 200 and can act on one or multiple axle(s).

Within the scope of the disclosure, a redundant control unit 104 is also provided, the redundant control unit 104 taking over the control of the braking system 101 in the event that an electronic stability control ESC1 of the central control unit 102 (cf. FIGS. 2 and 3) fails and/or no longer functions correctly. The redundant control unit 104 therefore includes or controls a secondary front axle brake controller 114, a secondary rear axle brake controller 116 and optionally a secondary trailer brake controller 118. The secondary trailer brake controller 118 is provided only for the case in which the vehicle 200 is equipped for pulling a trailer 204 (cf. FIG. 2). Otherwise it can be omitted. The central control unit 102 correspondingly includes a primary front axle brake controller, a primary rear axle brake controller, and a primary trailer brake controller, as is generally known. These are not shown in detail in FIG. 1.

Optionally, a redundant electronic stability control ESC2 is also provided, which is connected to the redundant control unit 104 in this case. The redundant electronic stability control ESC2 can provide redundant ESC signals SER at the redundant control unit 104, as described in detail further below. The redundant control unit 104 is connected to the electronically controllable steering device 103 and, at the electronically controllable steering device 103, provides redundant braking signals SBR, which the redundant control unit 104 preferably also provides at appropriate further modules in the braking system 101, for braking certain axles.

The redundant control unit 104 is provided for controlling at least one of the axles in an axle-wise manner, in particular the front axle VA and the rear axle HA, in the case of redundancy, that is, when the redundant control unit 104 takes over the control of the braking system 101. During an axle-wise control of an axle VA, HA, the same brake pressures are modulated at the appropriate brake actuators of this axle VA, HA. A wheel-specific braking operation then no longer takes place at this axle. For this reason, the redundant control unit 104 is connected to the electronically controllable steering device 103, which, in this case, then carries out laterally stabilizing steering interventions to keep the vehicle 200 in a tolerance corridor TK of a predefined target trajectory TSoll (cf. FIG. 4). While the central control unit 102 can therefore automatically control the braking system 101 during normal operation and permits a wheel-specific braking operation, the redundant control unit 104 and the electronically controllable steering device 103 act jointly in the case of a redundancy to keep the vehicle 200 on the target trajectory TSoll.

In addition to the target trajectory TSoll, the electronically controllable steering device 103 can also receive a steering wheel angle LW and a steering torque LM as a target value WSoll for the laterally stabilizing steering interventions and modulate these.

Figure 2:
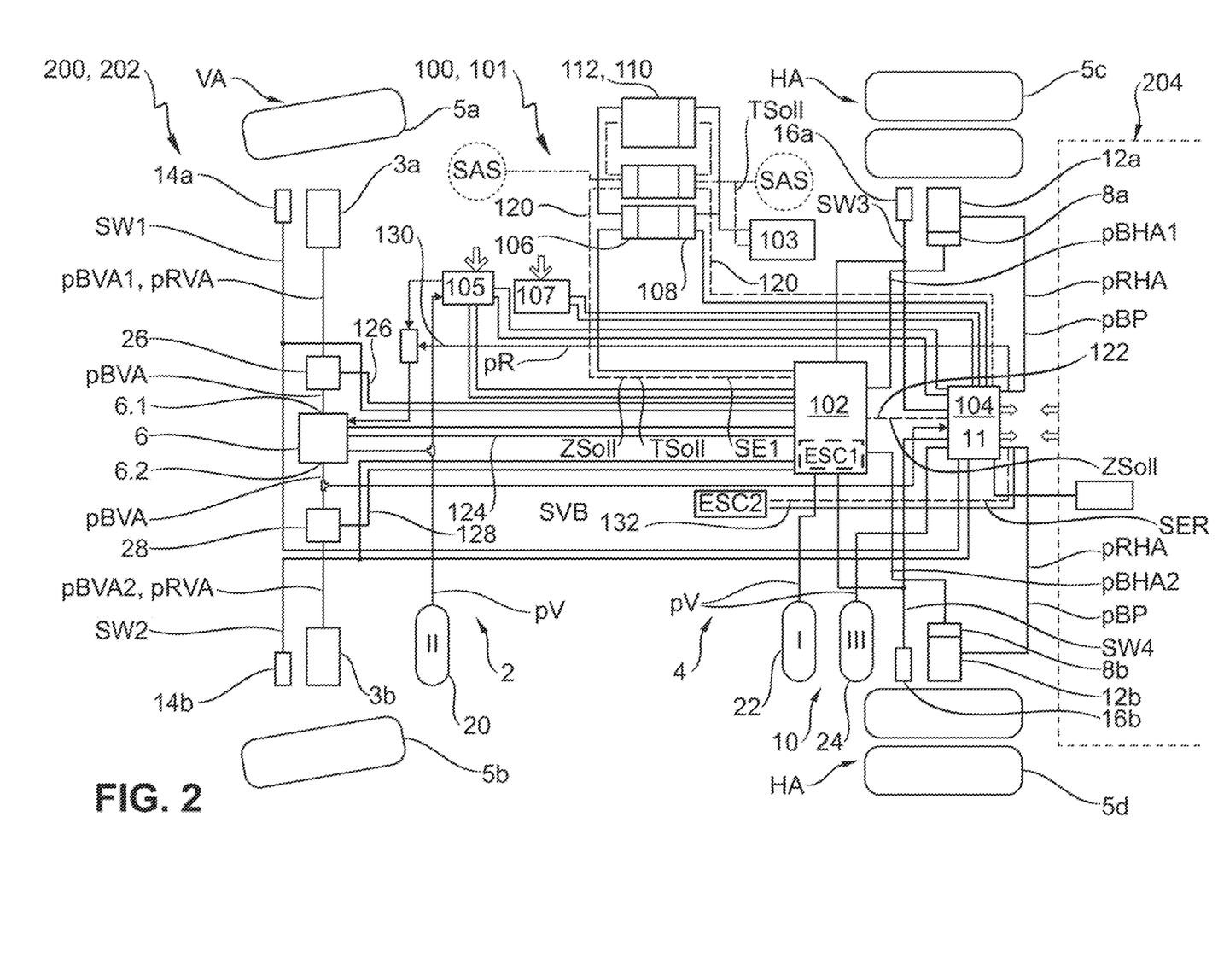
FIG. 2 shows a vehicle with a vehicle system according to the disclosure.
Figure 3:
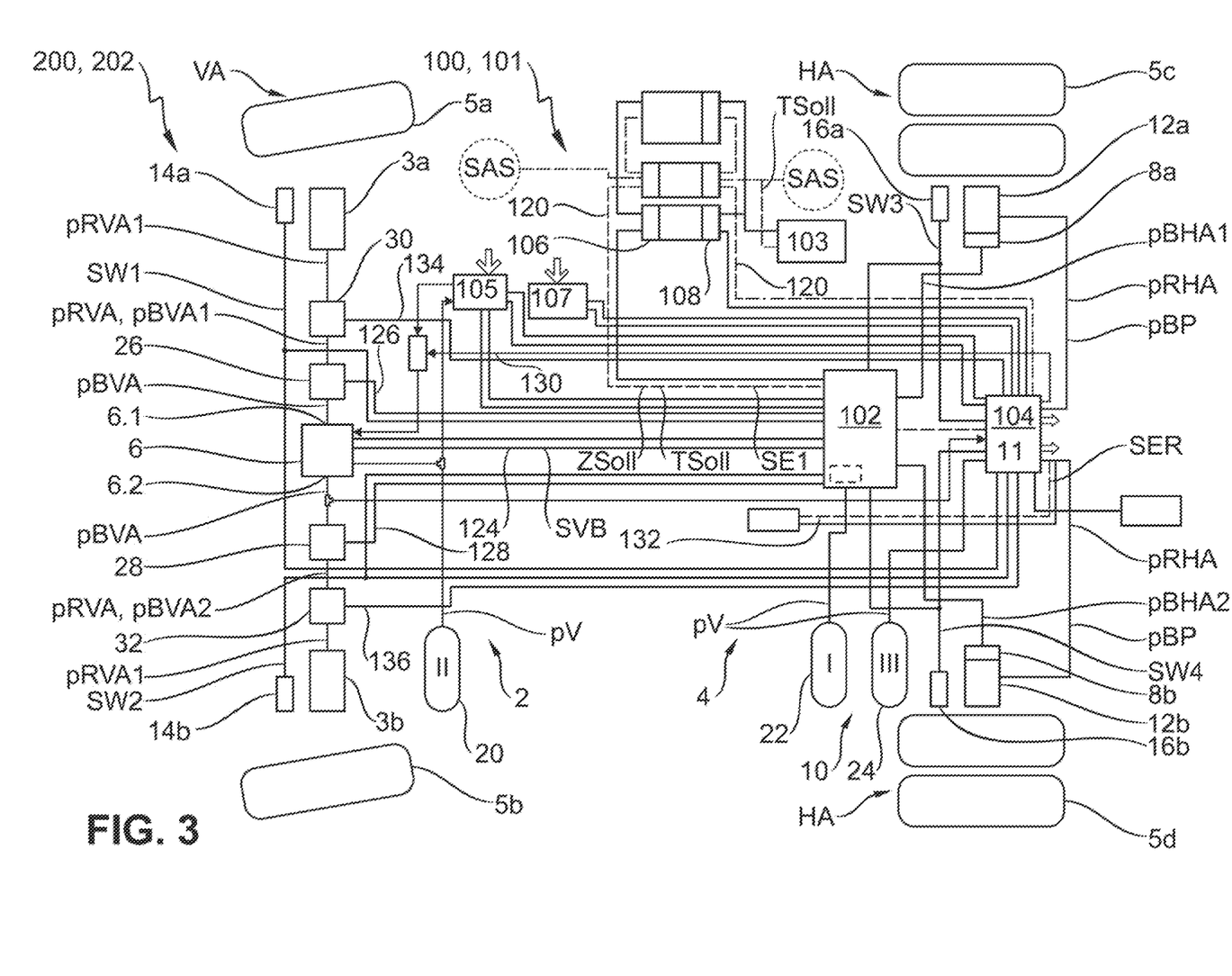
FIG. 3 shows a vehicle with a vehicle system in a second embodiment.

Now that the basic configuration of the vehicle system 100 has been described, FIGS. 2 and 3 show two specific implementations of the vehicle system 100 in a vehicle 200, namely, in particular, in a commercial vehicle 202. The commercial vehicle 202 includes an electronically controllable pneumatic braking system 101, as described in detail above. The electronically controllable pneumatic braking system has a first brake circuit 2, in the form of a front axle brake circuit for the front axle VA in this case, and a second brake circuit 4, in the form of a rear axle brake circuit for the rear axle HA in this case. The first brake circuit 2 is supplied from a first compressed air reservoir 20. The first compressed air reservoir 20 provides a supply pressure pV. In addition, first and second front axle brake actuators 3a, 3b are provided at the front axle VA, wherein the first front axle brake actuator 3a is provided for a first front wheel, namely the right front wheel 5a in this case, and the second front axle brake actuator 3b is provided for a second front wheel, namely the left front wheel 5b in this case. In this embodiment (FIG. 2), the first brake circuit 2 wheel-specifically provides a front axle brake pressure pBVA, more precisely, a first front axle brake pressure pBVA1 at the first front axle brake actuator 3a and a second front axle brake pressure pBVA2 at the second front axle brake actuator 3b.

The second brake circuit 4, namely the rear axle brake circuit in this case, is supplied from a second compressed air reservoir 22, which likewise provides a supply pressure pV. First and second rear axle brake actuators 8a, 8b, which are controlled via the second brake circuit 4, are provided at the rear axle HA. The first rear axle brake actuator 8a is provided for a first rear wheel 5c and the second rear axle brake actuator 8b is provided for a second rear wheel 5d. The second brake circuit 4 wheel-specifically provides a first rear axle brake pressure pBHA1 at the first rear axle brake actuator 8a and a second rear axle brake pressure pBHA2 at the second rear axle brake actuator 8b. Due to the wheel-specific modulation of the brake pressures pBVA1, pBVA2, pBHA1, and pBHA2, the vehicle 200 is kept on the target trajectory TSoll, which is provided from the target trajectories controller 110 of the central control unit 102.

In the embodiment shown, the braking system 101 also includes a parking brake circuit 10, which is supplied from a third compressed air reservoir 24. The third compressed air reservoir 24 also provides a supply pressure pV. The parking brake circuit 10 includes a parking brake module 11, which receives the supply pressure pV from the third compressed air reservoir 24. The parking brake circuit 10 includes first and second spring-loaded actuators 12a, 12b at the rear axle HA of the vehicle 200. In the embodiment shown in FIG. 2, the first and the second spring-loaded actuators 12a, 12b are integrated with the first and the second rear axle brake actuators 8a, 8b to form tristop brake cylinders. The parking brake module 11 modulates a parking brake pressure pBP at the first and the second spring-loaded actuators 12a, 12b. Spring-loaded actuators 12a, 12b are generally configured in such a way that they pressurelessly apply and, upon application of a pressure that exceeds a certain pressure, open counter to a pressure of a spring. Such spring-loaded actuators 12a, 12b are sufficiently known from the prior art.

In the braking system 101, the central control unit 102 is connected via a vehicle bus 120 to the unit for autonomous driving 112 and receives the target trajectory TSoll from the unit for autonomous driving 112. In addition, the central control unit 102 can also receive further signals, such as, for example, a deceleration target value ZSoll. The electronically controllable steering device 103 is also connected via the vehicle bus 120 to the braking system 101 and, thus, is also in communication with the central control unit 102. Moreover, the braking system 101 includes a redundant control unit 104 as described above with reference to FIG. 1, the redundant control unit 104 also being connected to the vehicle bus 120 in this case. In addition, the central control unit 102 and the redundant control unit 104 communicate directly with each other via a second bus 122 and, in this way, can exchange signals, such as, for example, the deceleration target value ZSoll. In the embodiment shown in FIG. 2, the redundant control unit 104 is integrated with the parking brake module 11. In particular, the redundant control unit 104 simultaneously also forms an electronic control unit of the parking brake module 11. This is particularly advantageous, since the parking brake module 11 has an electronic control unit anyway in the embodiment shown here. Alternatively and likewise preferably, the redundant control unit 104 is a separate module, however, and not integrated with the parking brake module 11.

In the embodiment shown here, the central control unit 102 also simultaneously forms a rear axle modulator and is directly connected to the second compressed air reservoir 22. This is also not absolutely necessary and the rear axle modulator could also be provided separately from the central control unit 102. The central control unit 102, which forms the rear axle modulator in this case, then wheel-specifically modulates appropriate first and second rear axle brake pressures pBHA1, pBHA2 at the rear axle HA based on the receipt of a deceleration target value ZSoll. The electronic control unit 102 includes an electronic stability control ESC1, which is integrated into the electronic control unit 102 in this case. The electronic stability control ESC1 is connected to first and second front axle wheel speed sensors 14a, 14b and to first and second rear axle speed sensors 16a, 16b. Via these, the central control unit 102 receives first, second, third, and fourth wheel speed signals SW1, SW2, SW3, SW4. These are used by the central control unit 102 and the electronic stability control ESC1 for achieving a wheel-specific modulation of the rear axle brake pressure pBHA into the first and the second rear axle brake pressures pBHA1, pBHA2, so that the first and the second rear wheels 5c, 5d do not lock up.

A front axle modulator 6, which does not have a separate intelligence, is provided at the front axle VA. The front axle modulator 6 is directly connected to the central control unit 102 via a front axle signal line 124, via which front axle brake signals SVB are provided. In response to the front axle brake signals SVB, one or multiple electromagnetic valve(s) within the front axle modulator 6 are immediately switched, in order to modulate a front axle brake pressure pBVA from the supply pressure pV applied at the front axle modulator 6. The front axle modulator 6 is configured as a two-channel front axle modulator in this case and includes a first front axle channel 6.1 and a second front axle channel 6.2. A first front axle ABS valve 26 is connected between the first front axle channel 6.1 and the first front axle brake actuator 3a. Similarly, a second front axle ABS valve 28 is connected between the second front axle channel 6.2 and the second front axle brake actuator 3b. The first and the second front axle ABS valves are controlled by the central control unit 102 via first and second ABS lines 126, 128, in order to derive or modulate the wheel-individually modulated first and second front axle brake pressures pBVA1 and pBVA2 from the front axle brake pressure pBVA. The central control unit 102 uses the first and the second wheel speed signals SW1, SW2 from the first and the second front axle wheel speed sensors 14a, 14b for this purpose.

Finally, the braking system 101 includes a manual braking value transducer 105 and a manual parking brake switch 107 for manual control, which is not described in greater detail here. Both of these are basically known and are not described in greater detail here. In the present description, the aspects in particular that relate to the autonomous operation of the braking system 101 are of interest.

For the case that the electronic stability control ESC1 of the primary system, including the central control unit 102, does not function or function correctly, the redundant control unit 104 takes over the control of the braking system 101. For this purpose, the redundant control unit 104 is cable-connected to the first and the second rear axle wheel speed sensors 16a, 16b and, from these, receives the third and the fourth wheel speed signals SW3, SW4. Since the redundant control unit 104 is connected to the vehicle bus 120 and, thus, receives the target deceleration ZSoll and the target trajectory TSoll, the redundant control unit 104 is capable of wheel-individually and redundantly braking the rear axle HA via the spring loaded actuators 12a, 12b in this case. For this purpose, the redundant control unit 104 modulates a redundant rear axle brake pressure pRHA wheel-individually for the first and the second rear wheels 5c, 5d. The redundant control unit 104 is also connected to the first and the second front axle wheel speed sensors 14a, 14b and, from these, therefore also receives the first and the second wheel speed signals SW1, SW2. The redundant control unit 104 cannot control the first and the second front axle ABS valves 26, 28, however. The redundant control unit 104 can modulate a redundancy pressure pR at the front axle modulator 6 only via a pneumatic redundancy pressure line 130, the redundancy pressure pR then being converted purely pneumatically by the front axle modulator 6 into the front axle redundancy brake pressure pRVA. This is not wheel-individual at the front axle VA. This means, the front axle VA is controlled in an axle-wise manner in this embodiment (FIG. 2). The redundant control unit 104 controls the front axle VA in an axle-wise manner while the rear axle HA is still braked wheel-individually. At the front axle VA, nevertheless, the first and the second wheel speed signals SW1, SW2 are tapped via the redundant cable connection to the first and the second front axle wheel speed sensors 14a, 14b and provided from the redundant control unit 104 via the vehicle BUS 120. Based thereon, the electronically controllable steering device 103 can carry out laterally stabilizing steering interventions for the front axle VA, in order to modulate the wheel-individual braking operation, which is no longer present at the front axle VA, and, thus, in order to ensure the vehicle stability.

In the embodiment shown here, the braking system 101 also includes a redundant electronic stability control ESC2, which is connected via a third BUS 132 to the redundant control unit 104 and provides redundant stability signals SWR at the redundant control unit 104. The redundant stability signals SWR can also be taken into account in the modulation of the rear axle redundancy brake pressure pRHA, and can also be provided for the electronically controllable steering device 103 via the vehicle BUS 120.

As also results from FIG. 2, the central control unit 102 is connected to a first voltage source 106, while the redundant control unit 104 is connected to a second voltage source 108. The first and the second voltage sources 106, 108 are separated, so that one voltage source does not fail due to a fault in the other voltage source. Moreover, the central control unit 102 provides ESC signals SE1 via the vehicle bus 120, which can then be received by the electronically controllable steering device 103, in order to take the ESC signals SE1 into account in the modulation of the laterally stabilizing steering interventions.

A second embodiment of the vehicle 200, which includes a second embodiment of the vehicle system 100, is represented in FIG. 3. In the following, the essential differences from the first embodiment (FIG. 2) are emphasized, while commonalities are not further described. Identical reference characters are used for identical or similar elements, and so reference is made in entirety to the above description for identical or similar elements.

A first essential difference is that, in this embodiment (FIG. 3), the rear axle HA is controlled in an axle-wise manner in the event that the redundant control unit 104 takes over the control of the braking system 101. This means, in this embodiment (FIG. 3), the rear axle redundancy brake pressure pRHA is not wheel-specifically modulated, as is the case in the first embodiment (FIG. 2). Rather, the same redundancy brake pressure, namely the rear axle redundancy brake pressure pRHA, is supplied to the left and the right rear wheels 5c, 5d and, thus, in this embodiment, to the first and the second spring-loaded actuators 12a, 12b. Nevertheless, a redundant cable connection to the rear axle wheel speed sensors 16a, 16b is also provided in this embodiment (FIG. 3), although this redundant cable connection can also be optionally omitted. It can be provided, for example, that the redundant control unit 104 receives the third and the fourth wheel speed signals SW3, SW4 via the vehicle BUS 120 and preferably ascertains a steering compensation to be modulated. The redundant control unit 104 can then transmit the ascertained steering compensation in the form of a steering angle or steering torque as a target value to the electronically controllable steering device 103, so that the electronically controllable steering device 103 can carry out the modulation of the laterally stabilizing steering interventions.

Moreover, in contrast to the first embodiment (FIG. 2), is it provided in the second embodiment (FIG. 3) that, in the case of redundancy, the front axle VA can be controlled in a wheel-wise manner. While an axle-wise control of the front axle VA therefore took place in the case of redundancy by the redundant control unit 104 in the first embodiment (FIG. 2), the front axle VA is braked in a wheel-wise manner in the second embodiment (FIG. 3).

For this purpose, initially further ABS valves are provided, namely a first redundancy ABS valve 30 and a second redundancy ABS valve 32. The first redundancy ABS valve 30 is connected between the first front axle ABS valve 26 and the first front axle brake actuator 3a. During normal operation, when the braking system 101 is controlled by the central control unit 102, the first redundancy ABS valve 30 is not actuated and passes the first front axle brake pressure pBVA1, which has been modulated by the first front axle ABS valve 26, through and with unchanged modulation at the first front axle brake actuator 3a. The second redundancy ABS valve 32 is connected in a corresponding way between the second front axle ABS valve 28 and the second front axle brake actuator 3b. The second redundancy ABS valve 32 is also open during normal operation and allows the second front axle brake pressure pBVA2 to pass through. The first and the second redundancy ABS valves 30, 32 are connected to the redundant control unit 104 via first and second redundancy ABS signal lines 134, 136. As is also the case in the first embodiment, the first and the second front axle wheel speed sensors 14a, 14b are also redundantly connected to the redundant control unit 104, so that the redundant control unit 104 receives the first and the second wheel speed signals SW1, SW2. In the second embodiment shown here (FIG. 3), it is therefore possible that, in the case of redundancy, the front axle VA is controlled wheel-specifically by the redundant control unit 104. While the front axle modulator 6 is configured having two channels and provides the front axle brake pressure pBVA, which has not been further modulated, at the first channel 6.1 and at the second channel 6.2, and, in this case, the first and the second front axle ABS valves 26, 28, when open, allow the front axle brake pressure pBVA to pass through, the first and the second redundancy ABS valves 30, 32 can modulate this pressure, in order to wheel-specifically provide the front axle redundancy brake pressure as a first front axle redundancy brake pressure pRVA1 to the first front axle brake actuator 3a and to wheel-specifically provide the second front axle redundancy brake pressure pRVA2 to the second front axle brake actuator 3b.

While only the front axle VA is controlled in an axle-wise manner and the rear axle HA is controlled in a wheel-wise manner in the first embodiment (FIG. 2), in the second embodiment (FIG. 3), only the rear axle HA is controlled in an axle-wise manner, while the front axle VA is controlled wheel-specifically. It is to be understood, however, that there can also be embodiments in which the front axle VA and the rear axle HA are both controlled in an axle-wise manner in the case of redundancy. For the case that further axles are provided, such as, for example, a second rear axle, a second front axle, or a supplementary axle, these axles can also be controlled in an axle-wise manner in the case of redundancy. It is not necessary that all axles are controlled in an axle-wise manner in the case of redundancy. Rather, it suffices when only one of these axles is controlled in an axle-wise manner.

Figure 4:
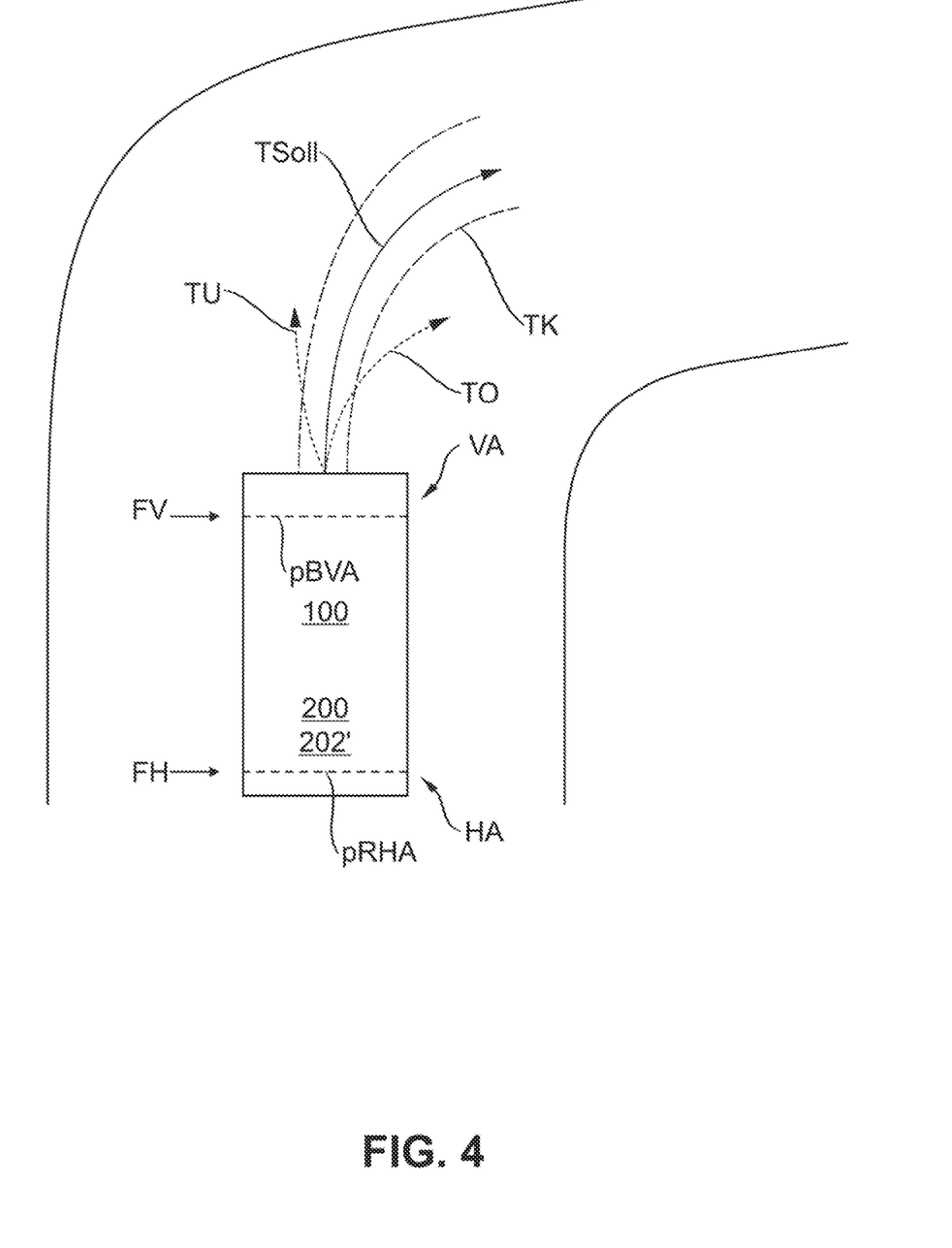
FIG. 4 shows a vehicle negotiating a curve.

This is also illustrated, in particular, in FIG. 4. FIG. 4 shows a vehicle 200, namely a commercial vehicle 202, which includes a vehicle system 100 according to the disclosure, while negotiating a curve. As demonstrated, the target trajectory TSoll through the curve is indicated, the target trajectory TSoll corresponding to a right-hand bend in this case. A tolerance corridor TK around the target trajectory TSoll is indicated. The vehicle 200 is to be kept within this tolerance corridor TK, also in the case of redundancy, when laterally stabilizing steering interventions are carried out via the electronically controllable steering device 103. A front axle cornering force FV and a rear axle cornering force FH are indicated at the vehicle 200. Since the vehicle 200 is in a redundancy operation and the redundant electronic control unit 104 has taken over the control, a front axle redundancy brake pressure pRVA is controlled at the front axle VA and a rear axle redundancy brake pressure pRHA is controlled at the rear axle HA.

If various cornering forces FV, FH are ascertained, it is preferred to increase the brake pressure modulation of the front axle redundancy brake pressure pRVA and the rear axle redundancy brake pressure pRHA at that vehicle axle from the front axle VA and the rear axle HA, at which the greater cornering force FV, FH is present. If, for example, the front axle cornering force FV is greater than the rear axle cornering force FH, it is preferred to increase the brake pressure level of the front axle redundancy brake pressure pRVA. The vehicle stability can be increased as a result.

When an oversteer TO is detected while negotiating a curve along the target trajectory TSoll, it is preferred to increase the brake pressure modulation of the front axle redundancy brake pressure pRVA at the front axle VA and optionally at the trailer 204 (cf. FIG. 2). As a result, there is more "push via the front axle" to be able to get out of the oversteer TO. Simultaneously, it is preferred that steering is carried out via the electronically controllable steering device 103 in the direction toward the outside of the curve, in order to further reduce the oversteer TO. Usually, such interventions in the normal operation can be achieved via the wheel-specific modulation of the front axle brake pressure pBVA. Since, however, in the redundancy operation according to the embodiment shown here (FIG. 4), the front axle VA and the rear axle HA are braked in an axle-wise manner, it is necessary that the electronically controllable steering device 103 carry out laterally stabilizing steering interventions in this case, a steering in the direction toward the outside of the curve in this case, in order to keep the vehicle 200 on the target trajectory TSoll and within the tolerance corridor TK.

If, in contrast thereto, an understeer TU of the vehicle 200 is detected, the brake pressure modulation of the rear axle redundancy pressure pRHA at the rear axle HA is preferably increased. Optionally, the brake pressure modulation at a trailer 204 is also increased. As a result, initially, the vehicle speed is reduced in combination with a simultaneously increased traction of the front axle VA to be able to get out of the understeer, in order to keep the vehicle 200 on the target trajectory TSoll.

Figure 5:
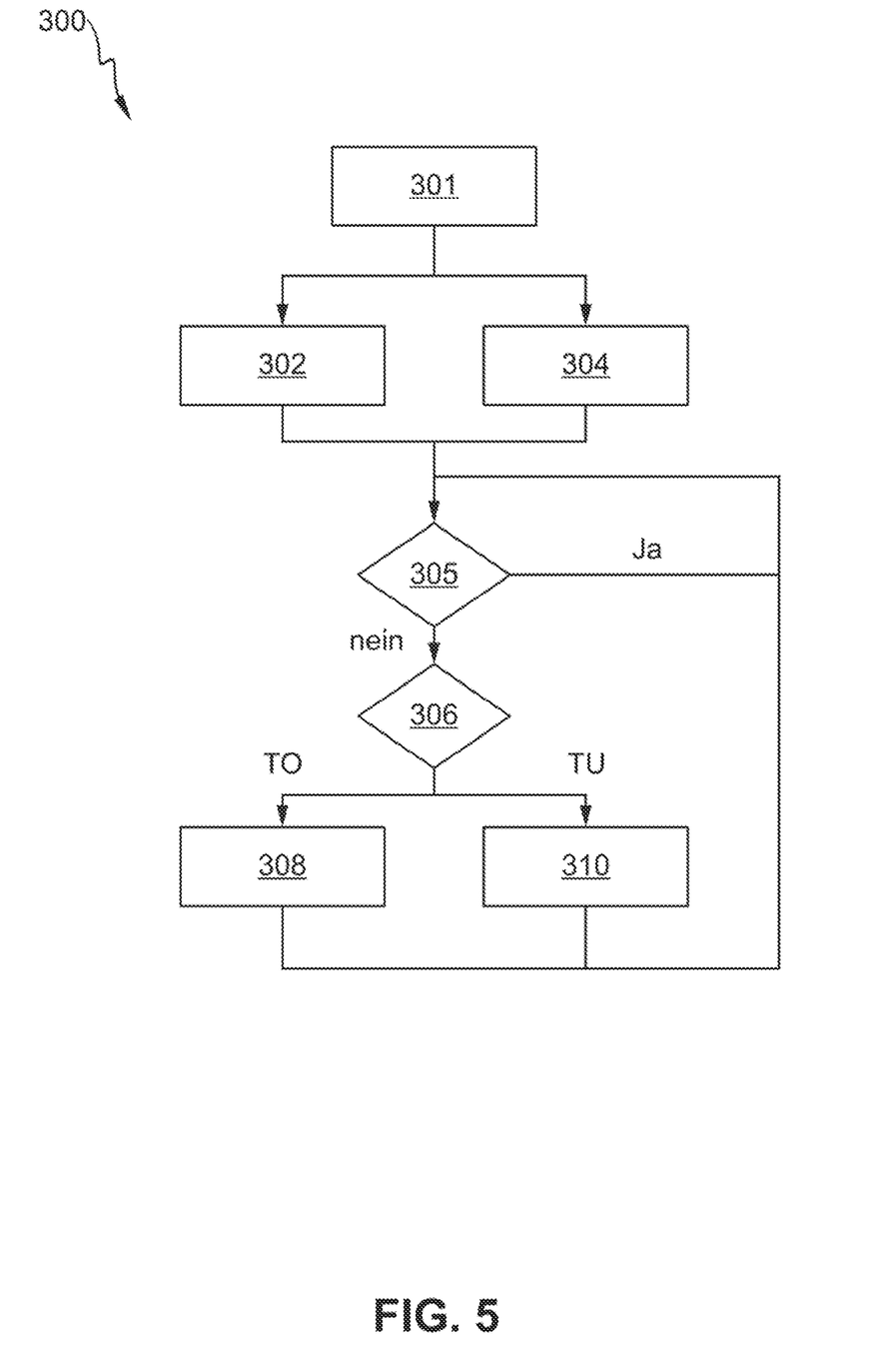
FIG. 5 shows a schematic sequence of a method.

FIG. 5 illustrates once more, purely schematically, a method 300 for decelerating and steering a vehicle 200, in particular a commercial vehicle 202, which includes a vehicle system 100 of one of the above-described preferred embodiments of a vehicle system 100 of the disclosure.

The method 300 begins with the step of ascertaining 301 a failure of an electronic stability control ESC1 (see FIGS. 2 and 3) of the electronically controllable pneumatic braking system 101. In response thereto, as described above, a redundant and axle-wise modulation 302 of the front axle redundancy brake pressure pRVA or of the rear axle redundancy brake pressure pRHA is carried out. Simultaneously, according to demand, laterally stabilizing steering interventions 304 are carried out, namely via the electronically controllable steering device 103, as described, in particular, above. As a result, the vehicle 200 is then to be kept in the tolerance corridor TK (cf. FIG. 4) of the predefined target trajectory TSoll.

In step 305, it is then checked whether the vehicle 200 is still on the target trajectory TSoll. If this is the case, the method returns to prior to the step 305 and a check is carried out again to determine whether the vehicle 200 is still on the target trajectory TSoll. If this is not the case, however, a check is carried out in step 306 to determine whether an oversteer or an understeer is present. If an oversteer TO is detected, then, preferably in step 308, the brake pressure modulation of the front axle redundancy brake pressure pRVA of the front axle VA is increased and, simultaneously, steering is carried out in the direction toward the outside of the curve via the electronically controllable steering device 103. If an understeer TU is detected, however, then, preferably in step 310, the brake pressure modulation of the rear axle redundancy brake pressure pRHA at the rear axle HA is increased. Thereafter, the method returns to the check to determine whether the vehicle 200 is on the target trajectory TSoll and within the tolerance corridor TK.

It is understood that the foregoing description is that of the preferred embodiments of the invention and that various changes and modifications may be made thereto without departing from the spirit and scope of the invention as defined in the appended claims.

LIST OF REFERENCE CHARACTERS (PART OF THE DESCRIPTION)

2 first brake circuit
3a, 3b first and second front axle brake actuators
4 second brake circuit
5a, 5b first and second front wheels
5c, 5d first and second rear wheels
6 front axle modulator
6.1 first front axle channel
6.2 second front axle channel
8a, 8b first and second rear axle brake actuators
10 parking brake circuit
12a, 12b first and second front spring-loaded actuators
14a, 14b first and second front axle wheel speed sensors
16a, 16b first and second rear axle wheel speed sensors
20 first compressed air reservoir
22 second compressed air reservoir
24 third compressed air reservoir
26 first front axle ABS valve
28 second front axle ABS valve
30 first redundancy ABS valve
32 second redundancy ABS valve
100 vehicle system
101 electronically controllable pneumatic braking system
102 central control unit
104 redundant control unit 106 first voltage source
108 second voltage source
110 target trajectories controller
112 unit for autonomous driving
114 secondary front axle brake controller
116 secondary rear axle brake controller
118 secondary trailer brake controller
120 vehicle BUS
122 second BUS
124 front axle signal line
126 first ABS signal line
128 second ABS signal line
130 pneumatic redundancy pressure line
132 third BUS
134 first redundancy ABS signal line
136 second redundancy ABS signal line
200 vehicle
202 commercial vehicle
204 trailer
300 method
301-310 steps
11 parking brake module
103 electronically controllable steering device
ESC1 electronic stability control
ESC2 redundant electronic stability control
FH rear axle cornering force
FV front axle cornering force
HA rear axle
HA2 further rear axle
LW steering wheel angle
LM steering torque
pBHA rear axle brake pressure
pBHA1 first rear axle brake pressure
pBHA2 second rear axle brake pressure
pBP parking brake pressure
pBVA front axle brake pressure
pBVA1 first front axle brake pressure
pBVA2 second front axle brake pressure
pRHA rear axle redundancy brake pressure
pRVA front axle redundancy brake pressure
pRVA1 first front axle redundancy brake pressure
pRVA2 second front axle redundancy brake pressure
TO oversteer
TK tolerance corridor
TSoll target trajectory
TU understeer
SBR redundant brake signals
SER redundant ESC signals
SVB front axle brake signal
SW1 first wheel speed signal
SW2 second wheel speed signal
SW3 third wheel speed signal
SW4 fourth wheel speed signal
VA front axle
WSoll target value for laterally stabilizing steering interventions
ZSoll deceleration target value

The invention claimed is:

1. A vehicle system for a vehicle, the vehicle system comprising:
an electronically controllable pneumatic braking system;
an electronically controllable steering device;
said electronically controllable pneumatic braking system having at least one first brake circuit, at least one second brake circuit, and an electronic central control unit for electronically controlling the first brake circuit and the second brake circuit;
said electronically controllable pneumatic braking system further having a plurality of front axle brake actuators including a first front axle brake actuator and a second front axle brake actuator for a first front wheel and a second front wheel at least at one front axle;
said electronically controllable pneumatic braking system further having a plurality of rear axle brake actuators including a first rear axle brake actuator and a second rear axle brake actuator for a first rear wheel and a second rear wheel at least at one rear axle;
said electronic central control unit being connected to an electronic stability control;
said electronic stability control being configured to wheel-individually actuate at least one of said plurality of front axle brake actuators and said plurality of rear axle brake actuators;
said electronically controllable pneumatic braking system further having a redundant electronic control unit configured to electronically control at least one of said first brake circuit and said second brake circuit in response to a failure of the electronic stability control during a trip of the vehicle;
wherein, in the event of the failure of the electronic stability control during the trip of the vehicle, said redundant electronic control unit is configured to perform axle-wise electronic control of at least one of the at least one front axle with a front axle redundancy brake pressure and the at least one rear axle with a rear axle redundancy brake pressure; and,
wherein said electronically controllable steering device is configured to carry out a laterally stabilizing steering intervention causing the vehicle to stay in a tolerance corridor of a predefined target trajectory of the vehicle.

2. The vehicle system of claim 1, wherein said electronically controllable steering device receives at least one of a steering wheel angle and a steering torque as a target value for the laterally stabilizing steering interventions and is configured to correct said at least one of said steering wheel angle and said steering torque as a target value.

3. The vehicle system of claim 1 further comprising a redundant electronic stability control, said redundant electronic stability control being connected to said redundant electronic control unit and configured to provide redundant ESC signals at said redundant electronic control unit.

4. The vehicle system of claim 3, wherein said electronically controllable steering device is connected to at least one of said redundant electronic control unit and said redundant electronic stability control for receiving redundant ESC signals.

5. The vehicle system of claim 1, wherein said electronic central control unit is connected to a first voltage source and said redundant electronic control unit is connected to a second voltage source, the second voltage source being independent of the first voltage source.

6. The vehicle system of claim 5, wherein said electronically controllable steering device or a portion of said electronically controllable steering device is connected to the second voltage source.

7. The vehicle system of claim 1, wherein said redundant electronic control unit is connected to at least one of a plurality of first wheel speed sensors and a plurality of second wheel speed sensors for receiving wheel speed signals.

8. The vehicle system of claim 1 further comprising a parking brake circuit having a parking brake module connected to said electronic central control unit; and, at least a first spring-loaded actuator and a second spring-loaded actuator at least at the rear axle or a further rear axle, wherein said redundant electronic control unit forms an electronic control unit of said parking brake module or is integrated with said parking brake module.

9. The vehicle system of claim 1, wherein, in the event of the failure of said electronic stability control, said redundant electronic control unit provides the front axle redundancy brake pressure at said first front axle brake actuator and said second front axle brake actuator during an axle-wise modulation of the front axle redundancy brake pressure, in order to brake the front axle in an axle-wise manner.

10. The vehicle system of claim 1, wherein the vehicle is a commercial vehicle.

11. A vehicle system for a vehicle, the vehicle system comprising:
an electronically controllable pneumatic braking system;
an electronically controllable steering device;
said electronically controllable pneumatic braking system having at least one first brake circuit, at least one second brake circuit, and an electronic central control unit for electronically controlling the first brake circuit and the second brake circuit;
said electronically controllable pneumatic braking system further having a plurality of front axle brake actuators including a first front axle brake actuator and a second front axle brake actuator for a first front wheel and a second front wheel at least at one front axle;
said electronically controllable pneumatic braking system further having a plurality of rear axle brake actuators including a first rear axle brake actuator and a second rear axle brake actuator for a first rear wheel and a second rear wheel at least at one rear axle;
said electronic central control unit being connected to an electronic stability control;
said electronic stability control being configured to wheel-individually actuate at least one of said plurality of front axle brake actuators and said plurality of rear axle brake actuators;
said electronically controllable pneumatic braking system further having a redundant electronic control unit configured to electronically control at least one of said first brake circuit and said second brake circuit in response to a failure of the electronic stability control during a trip of the vehicle;
wherein, in the event of the failure of the electronic stability control during the trip of the vehicle, said redundant electronic control unit is configured to perform axle-wise electronic control of at least one of the at least one front axle with a front axle redundancy brake pressure and the at least one rear axle with a rear axle redundancy brake pressure;
wherein said electronically controllable steering device is configured to carry out a laterally stabilizing steering intervention causing the vehicle to stay in a tolerance corridor of a predefined target trajectory of the vehicle; and,
wherein said electronically controllable steering device is connected to said central control unit for receiving ESC signals from said electronic stability control or signals derived or processed from the ESC signals.

12. The vehicle system of claim 11, wherein said electronically controllable steering device is connected to the redundant electronic control unit for receiving redundant ESC signals.

13. A method for decelerating and steering a vehicle, the method comprising:

ascertaining a failure of an electronic stability control of an electronically controllable pneumatic braking system;
in response to said ascertaining of the failure:
redundantly, and in an axle-wise manner, modulating at least one of a redundancy front axle brake pressure at least at one front axle and a redundancy rear axle brake pressure at least at one rear axle via a redundant control unit of the electronically controllable pneumatic braking system; and,
carrying out a laterally stabilizing steering intervention via an electronically controllable steering device causing the vehicle to stay in a tolerance corridor of a predefined target trajectory of the vehicle.

14. The method of claim 13 further comprising:
ascertaining a front axle cornering force at the at least one front axle;
ascertaining a rear axle cornering force at the at least one rear axle;
wherein the redundant control unit increases a brake pressure modulation at that vehicle axle from the front axle and the rear axle, at which the higher of the front axle cornering force and the rear axle cornering force is ascertained.

15. The method of claim 13 further comprising:
ascertaining an oversteer of the vehicle; and,
in response to the oversteer being ascertained:
increasing a brake pressure modulation of the redundancy front axle brake pressure at the front axle and optionally at a trailer; and,
steering via the electronically controllable steering device in a direction toward an outside of a curve.

16. The method of claim 13 further comprising:
ascertaining an understeer of the vehicle; and
in response thereto:
increasing a brake pressure modulation of the redundancy rear axle brake pressure at the rear axle and optionally at a trailer.

17. A method for decelerating and steering a vehicle having a vehicle system including: an electronically controllable pneumatic braking system; an electronically controllable steering device; said electronically controllable pneumatic braking system having at least one first brake circuit, at least one second brake circuit, and an electronic central control unit for electronically controlling the first brake circuit and the second brake circuit; said electronically controllable pneumatic braking system further having a plurality of front axle brake actuators including a first front axle brake actuator and a second front axle brake actuator for a first front wheel and a second front wheel at least at one front axle; said electronically controllable pneumatic braking system further having a plurality of rear axle brake actuators including a first rear axle brake actuator and a second rear axle brake actuator for a first rear wheel and a second rear wheel at least at one rear axle; said electronic central control unit being connected to an electronic stability control: said electronic stability control being configured to wheel-individually actuate at least one of said plurality of front axle brake actuators and said plurality of rear axle brake actuators; said electronically controllable pneumatic braking system further having a redundant electronic control unit configured to electronically control at least one of said first brake circuit and said second brake circuit in response to a failure of the electronic stability control during a trip of the vehicle; wherein, in the event of the failure of the electronic stability control during the trip of the vehicle, said redundant electronic control unit is configured to perform axle-wise electronic control of at least one of the at least one front axle with a front axle redundancy brake pressure and the at least one rear axle with a rear axle redundancy brake pressure; wherein said electronically controllable steering device is configured to carry out a laterally stabilizing steering intervention causing the vehicle to stay in a tolerance corridor of a predefined target trajectory of the vehicle; and, wherein the method comprises:
ascertaining a failure of the electronic stability control of the electronically controllable pneumatic braking system;
in response to the ascertainment of the failure:
redundantly, and in an axle-wise manner, modulating at least one of the redundancy front axle brake pressure at least at one front axle and the redundancy rear axle brake pressure at least at one rear axle via the redundant electronic control unit of the electronically controllable pneumatic braking system; and,
carrying out the laterally stabilizing steering intervention via the electronically controllable steering device causing the vehicle to stay in the tolerance corridor of the predefined target trajectory of the vehicle.

18. The vehicle of claim 17, wherein the vehicle is a commercial vehicle.

19. A vehicle comprising a vehicle system including:
an electronically controllable pneumatic braking system;
an electronically controllable steering device;
said electronically controllable pneumatic braking system having at least one first brake circuit, at least one second brake circuit, and an electronic central control unit for electronically controlling the first brake circuit and the second brake circuit;
said electronically controllable pneumatic braking system further having a plurality of front axle brake actuators including a first front axle brake actuator and a second front axle brake actuator for a first front wheel and a second front wheel at least at one front axle;
said electronically controllable pneumatic braking system further having a plurality of rear axle brake actuators including a first rear axle brake actuator and a second rear axle brake actuator for a first rear wheel and a second rear wheel at least at one rear axle;
said electronic central control unit being connected to an electronic stability control;
said electronic stability control being configured to wheel-individually actuate at least one of said plurality of front axle brake actuators and said plurality of rear axle brake actuators;
said electronically controllable pneumatic braking system further having a redundant electronic control unit configured to electronically control at least one of said first brake circuit and said second brake circuit in response to a failure of the electronic stability control during a trip of the vehicle;
wherein, in the event of the failure of the electronic stability control during the trip of the vehicle, said redundant electronic control unit is configured to perform axle-wise electronic control of at least one of the at least one front axle with a front axle redundancy brake pressure and the at least one rear axle with a rear axle redundancy brake pressure; and,
wherein said electronically controllable steering device is configured to carry out a laterally stabilizing steering intervention causing the vehicle to stay in a tolerance corridor of a predefined target trajectory of the vehicle.

* * * * *